Patented Oct. 15, 1935

2,017,594

UNITED STATES PATENT OFFICE 2,017,594

INSECTICIDE

Charles B. Gnadinger, Minneapolis, Minn.

No Drawing. Application January 16, 1932,
Serial No. 587,147

13 Claims. (Cl. 167—14)

This invention relates to the production of substances for killing red spiders and their eggs and has, among its objects, to provide substances which, although well adapted for general use, are particularly adapted for use on delicate plants, and which are adapted to kill spiders and eggs, without damage to the plant, whatever the stage of growth of the plant. The invention also relates to and is applied to the production of substances for killing insects in general, including red spiders and other similar mites, and also including aphids, leaf rollers, cyclamen mites, mealy bugs, and many others.

The red spider (*Tetranychus telarius L.*) probably causes more serious damage to a larger number of species of plants than almost any other greenhouse pest. Many compounds have been recommended for exterminating, or controlling red spiders. However, these compounds either do not kill the spider, or if they do kill, also damage the plants. The red spider seems peculiarly immune to contact insecticides which readily kill insects such as potato beetles, Japanese beetles, cockroaches, tarnished plants bugs, etc. Mechanical methods, such as spraying with cold water under high pressure, are not very effective, and generally cannot be applied when most needed, because of the damage to the plants or danger of fungicidal diseases. The present invention provides substances which are extremely efficient and which do not injure the plants in any way. Moreover, the discovered products, herein disclosed, do not require high pressure spraying. This is of particular advantage where the control is for plants such as gladioli, asters, carnations, mums, or any delicate plant.

It is believed that the desired action, for all purposes herein, is principally due to the presence of selenium. The element selenium is closely chemically related to sulphur, and dissolves in alkaline sulphide solutions forming complex alkaline sulpho-selenides.

The use of calcium and barium seleno-sulphides is objectionable because they are more caustic than sodium-ammonium or potassium-ammonium seleno-sulphides, and a soap spreader cannot be used with them, because the soap is precipitated. Therefore, when those substances are used, it is necessary, in order to get a kill, to use so much caustic that the plants are injured. By the terms "sodium seleno-sulphide", "potassium seleno-sulphide" and "ammonium seleno-sulphide", I mean products respectively containing: sodium, selenium and sulphur; potassium, selenium and sulphur; and ammonium selenium and sulphur.

As a quantitative example, for carrying out the invention, proceed as follows: Dissolve 225 grams of potassium hydroxide (88%) in 300 cc. of water; cool and saturate with hydrogen sulphide; add 250 cc. of $NH_4OH$ solution (28% $NH_3$); mix and add 50 grams of powdered selenium; as soon as the selenium is dissolved, dilute with water to 1000 cc. This concentrate is now diluted to obtain concentrations within the range of one part by volume of the concentrate to from 25 to 400 parts of water. Finally add .2 grams to .4 grams of soap per 100 cc. of the diluted liquid.

The following discovered combinations are claimed herein: The amount of each substance in grams per 100 cc. of the liquid is given, and is the amount in the diluted spray ready for use:

Formula 1—KOH, .20; $H_2S$, .12; $NH_3$, .061; Se, .05.

Formula 2—KOH, .16; $H_2S$, .096; $NH_3$, .036; Se, .04.

Formula 3—KOH, .20; $H_2S$, .12; Se, .02.

Formula 4—KOH, .10; $H_2S$, .060; $NH_3$, .031; Se, .025.

Formula 5—KOH, .16; $H_2S$, .096; $NH_3$, .048; Se, .06.

Formula 6—KOH, .40; $H_2S$, .12; Se, .05.

Formula 7—NaOH, .143; $H_2S$, .12; $NH_3$, .061; Se, .05.

In each of the foregoing formulas .2 gram of soap per 100 cc. of diluted liquid spray is used as a spreader.

There is no intention to limit the invention to the above specific formulas, although these are also claimed. It is also to be understood that the amounts of selenium can be varied, within the limits of solubility.

In the claimed formulas or combinations, selenium was dissolved respectively in solutions of potassium, hydrogen sulphide (Formula 3); in potassium ammonium sulphide (Formulas 1, 2 and 5); and potassium sulphide (Formula 6). It is found that the proper toxicity (without injury to plants) is principally due to the presence of selenium. An equivalent amount of sodium hydroxide can be used to replace the potassium hydroxide, for example see Formula 7.

It is to be noted that the use of too much soap or spreader will result in injury and/or burning of the plants. The use of about one-half an ounce of soap to the gallon gives a perfect covering on the leaves of carnations, gladioli, or similar foliages which are not thoroughly wetted by oil emulsions. Soap has the advantage of not removing the "bloom" from the leaves of carnations, blue spruce and similar foliages.

I claim as my invention:

1. A process of making a substance of the nature described, which consists in adding hydrogen sulphide to a solution of potassium hydroxide, adding ammonia and then adding selenium.

2. The process of making a substance of the nature described which consists in saturating a solution of sodium hydroxide with hydrogen sulphide, adding ammonia and then dissolving therein selenium.

3. The process of making a substance described which consists in, dissolving approximately 225 grams of potassium hydroxide (88%) in 300 cc. of water, cooling the mixture and saturating it with hydrogen sulphide, adding 250 cc. of ammonium hydroxide solution (28% $NH_3$); mixing and adding 50 grams of powdered selenium, and after the selenium has dissolved, diluting with water to 1000 cc.

4. The process of making a substance described, which consists in, dissolving approximately 225 grams of potassium hydroxide (88%) in 300 cc. of water, cooling the mixture and saturating it with hydrogen sulphide, adding 250 cc. of ammonium hydroxide solution (28% $NH_3$); mixing and adding 50 grams of powdered selenium, and after the selenium has dissolved diluting with water to 1000 cc., then diluting with water to obtain concentrations within the range of one part by volume of the concentrate to 50 to 200 parts of water, and adding soap within the range of .2 to .4 grams per 100 cc.

5. The process of making a liquid insecticide which consists in combining the following substances in amounts within the ranges set forth, said amounts being in grams per 100 cc. of liquid: Potassium hydroxide .10 to .143; hydrogen sulphide .12 to .060; ammonia .02 to .061; selenium .04 to .025.

6. An insecticide containing a sodium selenosulphide.

7. An insecticide containing potassium selenosulphide.

8. An insecticide containing a seleno-sulphide of an alkali metal selected from the group consisting of sodium and potassium.

9. A liquid insecticide resultant from the bringing together of the following substances in grams per 100 cc. of liquid and in proportions within the range set forth: KOH .10 to 40; $H_2S$ .12 to .060; $NH_3$ .02 to .031; Se .04 to .025 and 2 grams of soap per 100 cc. of the diluted liquid.

10. A liquid insecticide resultant from the bringing together of the following substances in grams per 100 cc. of liquid and in proportions within the range set forth: KOH .20 to .40; $H_2S$ .060; Se .05 to .06.

11. A process for making a substance of the nature described which consists in combining the following substances in amounts within the ranges set forth, said amounts being in grams per 100 cc. of liquid: an alkali metal selected from the group consisting of sodium and potassium .10 to .40; $H_2S$ .12 to .060; $NH_3$ .02 to .061; selenium .04 to .025.

12. An insecticide containing potassium-ammonium seleno-sulphide.

13. An insecticide containing sodium-ammonium seleno-sulphide.

CHARLES B. GNADINGER.